(12) United States Patent
Lewis et al.

(10) Patent No.: US 11,094,190 B2
(45) Date of Patent: Aug. 17, 2021

(54) METHOD AND DEVICE FOR USING TELECOMMUNICATION NETWORKS TO CONTROL MEDIA AND ENTERTAINMENT DEVICES

(71) Applicants: Sherman Lewis, Lees Summit, MO (US); Holly Lynn Lewis, Lees Summit, MO (US)

(72) Inventors: Sherman Lewis, Lees Summit, MO (US); Holly Lynn Lewis, Lees Summit, MO (US)

(*) Notice: Subject to any disclaimer, the term of this patent is extended or adjusted under 35 U.S.C. 154(b) by 0 days.

(21) Appl. No.: 16/741,573

(22) Filed: Jan. 13, 2020

(65) Prior Publication Data

US 2020/0152050 A1    May 14, 2020

Related U.S. Application Data

(63) Continuation-in-part of application No. 12/869,430, filed on Aug. 26, 2010, now abandoned.

(60) Provisional application No. 61/237,007, filed on Aug. 26, 2009.

(51) Int. Cl.
| | | |
|---|---|---|
| G06F 15/16 | (2006.01) | |
| G08C 17/02 | (2006.01) | |
| H04L 29/06 | (2006.01) | |
| H04L 29/08 | (2006.01) | |
| H04N 21/41 | (2011.01) | |
| H04N 21/4147 | (2011.01) | |
| H04N 21/426 | (2011.01) | |
| H04N 21/418 | (2011.01) | |
| H04N 21/4227 | (2011.01) | |
| H04N 21/422 | (2011.01) | |

(52) U.S. Cl.
CPC .......... *G08C 17/02* (2013.01); *H04L 65/4084* (2013.01); *H04L 67/1095* (2013.01); *H04N 21/4104* (2013.01); *H04N 21/4147* (2013.01); *H04N 21/4184* (2013.01); *H04N 21/426* (2013.01); *G08C 2201/42* (2013.01); *G08C 2201/92* (2013.01); *G08C 2201/93* (2013.01); *H04N 21/4227* (2013.01); *H04N 21/42203* (2013.01)

(58) Field of Classification Search
USPC ....... 348/734; 386/292; 715/762; 725/61, 81
See application file for complete search history.

(56) References Cited

U.S. PATENT DOCUMENTS

| 8,925,010 B2* | 12/2014 | Ho | H04N 21/4325 |
| | | | 725/44 |
| 2004/0250273 A1 | 12/2004 | Swix | |
| 2005/0028208 A1* | 2/2005 | Ellis | H04N 7/173 |
| | | | 725/58 |
| 2005/0235338 A1 | 10/2005 | AbiEzzi | |
| 2005/0278755 A1* | 12/2005 | Kuo | H04N 21/4131 |
| | | | 725/80 |

(Continued)

*Primary Examiner* — Quang N Nguyen (57) ABSTRACT

A system and method for controlling media devices over telecommunication networks is disclosed. In particular embodiments, the system and method utilize cellular telecommunication networks. The present system and method allows a user to control and, in some instances, unify a multitude of devices over the telecommunication network. Through telecommunication networks, such as cellular networks, media and entertainment can be shared between multiple devices.

17 Claims, 7 Drawing Sheets

(56) References Cited

U.S. PATENT DOCUMENTS

| | | | |
|---|---|---|---|
| 2007/0124772 A1* | 5/2007 | Bennett | H04N 21/43615 725/61 |
| 2007/0124778 A1* | 5/2007 | Bennett | H04N 21/42206 725/81 |
| 2007/0162939 A1 | 7/2007 | Bennett | |
| 2007/0234224 A1* | 10/2007 | Leavitt | G06F 1/169 715/762 |
| 2008/0028208 A1 | 1/2008 | Bolcer | |
| 2009/0052870 A1* | 2/2009 | Marsh | H04N 21/47214 386/292 |
| 2010/0064334 A1 | 3/2010 | Blackburn | |
| 2010/0205628 A1* | 8/2010 | Davis | H04N 21/41265 725/25 |
| 2011/0047581 A1 | 2/2011 | Caspi | |
| 2011/0072347 A1 | 3/2011 | Krampf | |
| 2011/0090408 A1 | 4/2011 | Ergen | |
| 2013/0227619 A1* | 8/2013 | Lewis | H01Q 3/2605 725/81 |
| 2014/0156801 A1* | 6/2014 | Fernandes | H04L 67/26 709/219 |
| 2014/0267931 A1* | 9/2014 | Gilson | H04N 21/42222 348/734 |
| 2019/0208257 A1* | 7/2019 | Hsiao | H04N 21/482 |

\* cited by examiner

METHOD AND DEVICE FOR USING TELECOMMUNICATION NETWORKS TO CONTROL MEDIA AND ENTERTAINMENT DEVICES

The current application claims priority to the U.S. patent application Ser. No. 12/869,430, filed on Aug. 26, 2010, which claims the benefit of priority to U.S. Provisional Patent application Ser. No. 61/237,007 filed on Aug. 26, 2009.

FIELD OF THE INVENTION

The present invention relates generally to a system for unifying and sharing media data between different entertainment devices by controlling the entertainment devices over a telecommunications network. More specifically, the system can link all of the different entertainment devices for sharing of media for convenience and expansion of entertainment experiences using cellular telecommunications.

BACKGROUND OF THE INVENTION

Currently, many different types of entertainment is offered to families including games, DVR, DVD movies, Blue Ray movies, internet streaming, or radio broadcasting. However, with so many different types of entertainment different devices are required. To enjoy these multiple forms of entertainment can require a lot of time and work for setup. Every time user may want to enjoy different forms of entertainment, he/she is required to activate multiple devices. Additionally, many consumers purchase DVDs and CDs only to damage or lose the discs shortly after. This results in a considerable amount of unnecessary waste. The present invention is a unification system that allows users to control all forms of entertainment systems with a single system. The unification system also allows users to share media across differing devices. The users will also allow users to rent, purchase, compile and access a variety of media from the comfort of their home. The system is eco-friendly through eliminating the need to purchase CDs and DVDs.

There are also many commercials that are aired on children networks that are inappropriate. Because these commercials are broadcasted by the television stations, parents are helpless in editing this content and are unable to control what their children are viewing. Many video games also contain graphics that are not suitable to children. Parents need a new way to take control of their children's entertainment. The present invention allows user to edit scenes, graphics, and language on all movies, television shows, commercials, music, games and the like.

DETAIL DESCRIPTIONS OF THE INVENTION

All illustrations of the drawings are for the purpose of describing selected versions of the present invention and are not intended to limit the scope of the present invention.

The present invention is a method of unifying all entertainment devices through wired or wireless means. The process and devices involved with unification also allows the devices to share media and other data between each other. The entertainment devices include game consoles, televisions, AM/FM radios, computers, DVR systems, CD players, DVD players, blu-ray players, stereo systems, or any other forms of electronic entertainment. The present invention makes use of a system that comprises of a plurality of devices including an entertainment main console 4, a remote base 3, a universal media remote 2, a remote multimedia player 1, and streaming dock 6. These components of the present invention are part of a system to be integrated to the separate and different forms of entertainment within a household integrating the internet.

The present methods and devices utilize telecommunications networks to control entertainment devices. In particular embodiments, the telecommunications networks comprise cellular networks. The cellular networks utilize frequency-division multiple access, time-division multiple access, code-division multiple access, global system for mobile, long-term evolution, WiMax, and 5G. Telecommunication networks typically utilize base stations that produce a wireless signal that is received by a mobile device.

Figure 1:
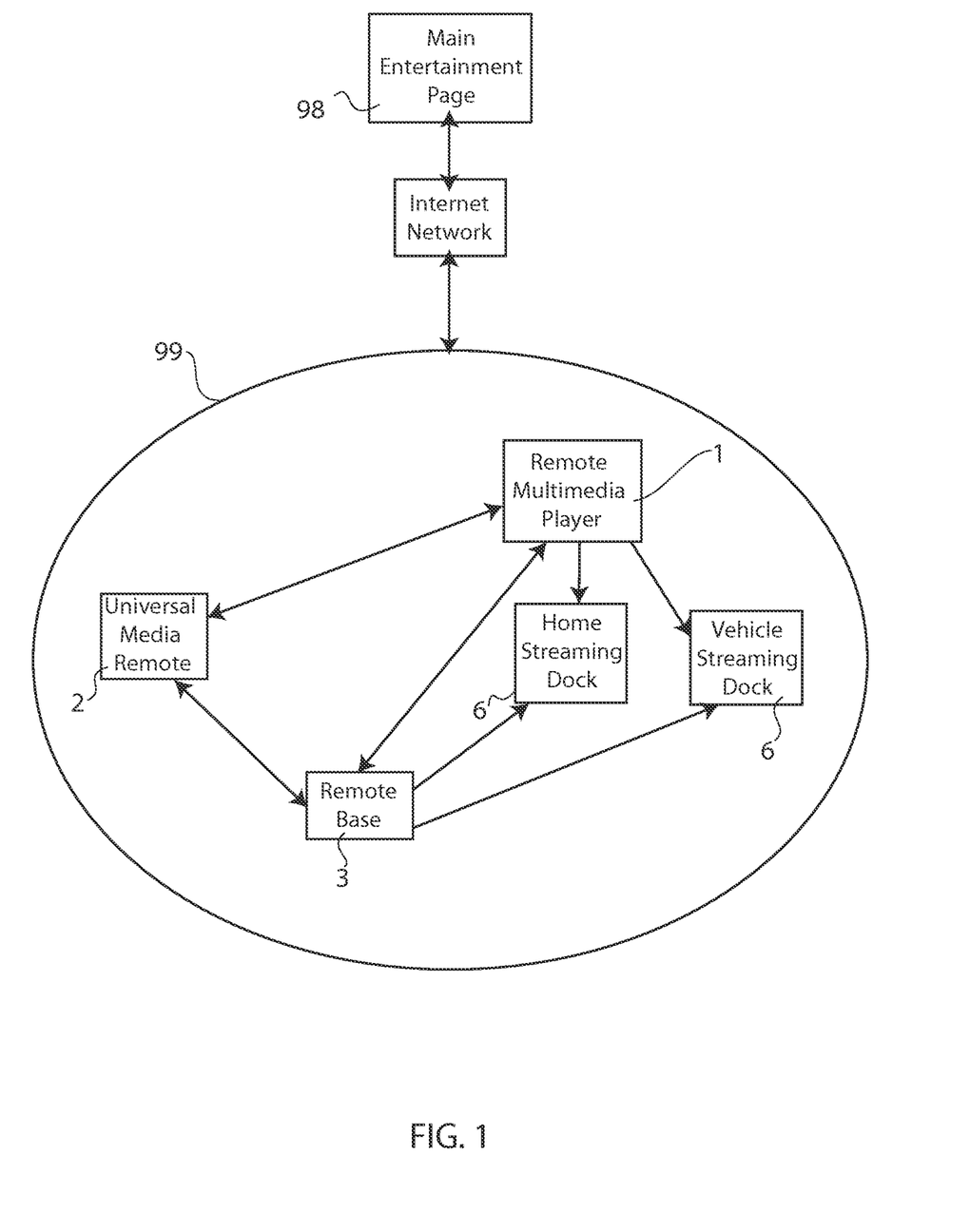
FIG. 1 is a wireless connection diagram of the present invention with all of the plurality of devices within the range of the wireless network of the remote base. The arrows represent the transmission and receiving of media data. The wireless network allows the devices to access the internet network and the main entertainment page to stream media.
Figure 2:
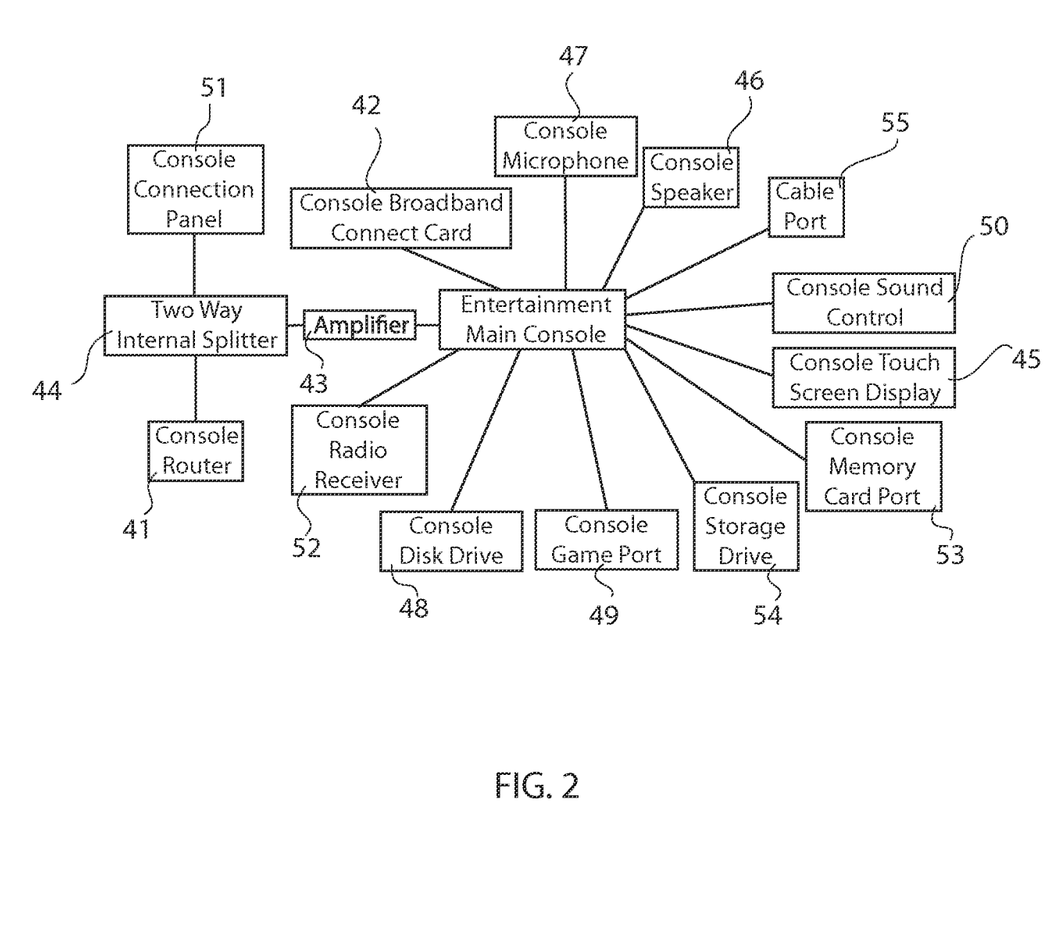
FIG. 2 is a system diagram of the entertainment main console.

In reference to FIG. 2, the entertainment main console 4 is the console system can act like a cable box for providing all the different television channels. To receive the cable television feed, the entertainment main console 4 is connected to a cable port 55. When the cable television feed is provided to the entertainment main console 4, the cable television feed is amplified with an amplifier 43. The amplification of the cable television feed is to split the data to two paths. The split of the feed is performed by a two way internal splitter 44 of the entertainment main console 4. The purpose of splitting the data feed of cable is to provide the cable entertainment to the television that the entertainment main console 4 is connected to as well as cable television to the plurality of devices. The entertainment main console 4 includes a console router 41, which allows it to provide a wireless network 99 for the plurality of devices to access. The entertainment main console 4 is able to provide the plurality of devices cable television entertainment through this wireless network 99. The entertainment main console 4 also comprises of a console radio receiver 52 to provide radio entertainment. A speaker system can be connected to a console connection panel 51 on the entertainment main console 4 to play the music originating from the console radio receiver 52. The console connection panel 51 is able to connect satellite systems such as surround sound speakers. If a speaker system is not available, the entertainment main console 4 also comprises of a console speaker 46 where the radio can be played as well. An additional method to play the radio is to relay the audio through the speaker system in a television. It should be noted that the entertainment main console 4 can be associated directly with an entertainment device such as a television. In other words, the entertainment main console 4 can be a component of a device. In some embodiments, the component is a sim card.

The entertainment main console 4 comprises of a console storage drive 54 and a console memory card port 53 to allow for storage of media. The ability to store media data allows the entertainment main console 4 to act as a digital video recording system as well. While watching television, the user can have the entertainment main console 4 record and store media data into either the console storage drive 54 or any console memory card in the console memory card port 53. The console memory card port 53 provides users another way to transfer data between the plurality of devices. The user can remove the console memory card to store data from other sources. The entertainment main console 4 can additionally obtain media data from discs including compact discs, DVDs, or Blue-Ray discs. The entertainment main console 4 comprises of a console disc drive 48 to read and transfer media data from the discs that are inserted onto the console storage drive 54.

The entertainment main console 4 also comprises of a console game port 49 that allows users to connect any handheld games for uploading to the console storage drive 54. By doing so, the games can be played off of the entertainment main console 4 or shared to the plurality of devices that are connected to the wireless network 99 provided by the console router 41. However, the entertainment main console 4 is able to purchase games through the internet network by accessing gaming websites such as Pandora, Gamestop, or any other online game vendors as well as all other forms of media available through the internet. Users will be able to play the uploaded and purchased games directly on the entertainment main console 4.

In some embodiments, the means of control for the entertainment main console 4 include a console sound control 50, a console touch screen display 45, a console microphone 47, and the console speaker 46. The console sound control 50 allows the user to control the sound output from the entertainment main console 4. This includes the adjustment of volume, equalization filtering, bass, treble, surround sound, and other sound properties. The user can also activate and interact with the entertainment main console 4 by means of the console speaker 46 and the console microphone 47. However, the main method of interaction will be the user's interaction with the entertainment main console 4 through the console touch screen display 45. The console touch screen display 45 will allow the user to manage media data in the entertainment console. The user is also able to customize the console touch screen display 45 to show different displays. These displays may be streamed from the user's personal computer, cell phone, or just simply the television. Being able to display the screens of different devices on the console touch screen display 45, the entertainment main console 4 being connected to a television can also display the screens of the different devices directly on television. Through the entertainment main console 4, switching between games, television shows, DVD players, personal photos, or any other media is more convenient. The console touch screen display 45 is also customizable to have different screen savers when inactive along with interchangeable user interface similar to a cellular device. The entertainment main console 4 can also be controlled remotely by means of the universal media remote 2. The entertainment main console 4 will have an infrared receiver to receive direct commands from the universal media remote 2.

Figure 4:
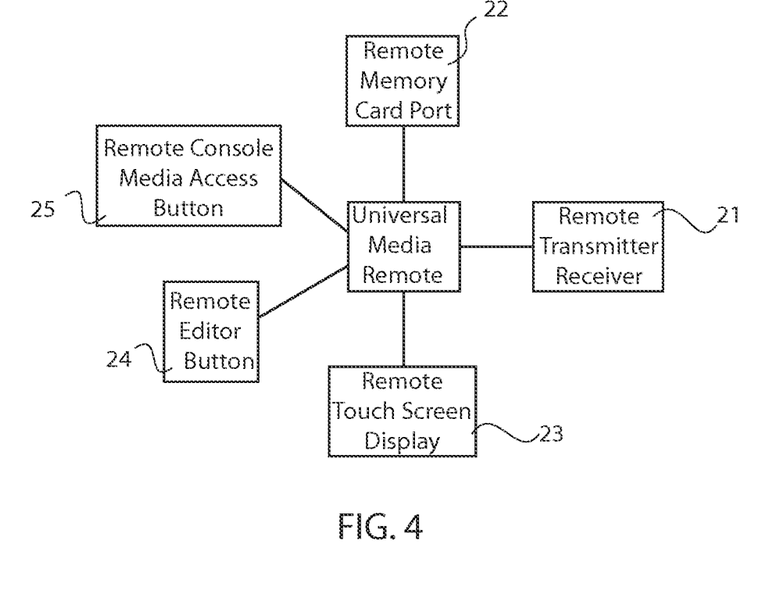
FIG. 4 is a system diagram of the universal media remote.

In reference to FIG. 4, the universal media remote 2 is a device that is able to control the plurality of devices for standard television and all other functions. However, it is mainly used to allow users to control the streaming dock 6 and the entertainment main console 4 remotely. The universal media control is able to send commands and access other devices through wireless means such as infrared signals and broadband radio signals. The radio signals include wireless-N signals, Bluetooth, or any other suitable radio signals for wireless transfer of data. The universal media remote 2 is able to transmit and receive media data and command data wirelessly or wired means by a remote transmitter receiver 21 and a USB port. The remote transmitter receiver 21 is able to transmit and receive data signals of a large range of frequencies in the form electromagnetic waves. With the remote transmitter receiver 21, the universal media can also access and receive any data stored in the plurality of devices. The universal media remote 2 is able to store media data by means of a remote memory card positioned in a remote memory card port 22. The user is able to manage the media data stored in the universal media remote 2 by means of a remote touch screen display 23. With the universal media remote 2 every television and electronic devices, such as computers, game consoles, laptops with wireless network 99 or not will have internet and media access. If the electronic devices do not have wireless access, they can be connected through a USB network connection card. The universal media remote 2 additionally comprises of a remote editor button 24 and a remote console media access button 25 for accessing the entertainment main console 4. The remote editor button 24 is a type of shortcut button located on the universal media remote 2 to allow the user to access the media content stored in the entire system of the present invention for moderation. With the remote editor button 24 the user can remove any vulgar words from the media data. The remote console media access button 25 allows users to access the media data stored in the entertainment main console 4. The universal media remote 2 also makes use of a scroll ball or mouse like feature for easy entertainment access similar to an Apple Ipod. The universal media remote 2 is powered by batteries and with longer usage will lose functionality due to lack of power. To re-charge the batteries, the universal media remote 2 can docked onto the remote base 3 or be connected to the entertainment main device to be recharged.

Figure 3:
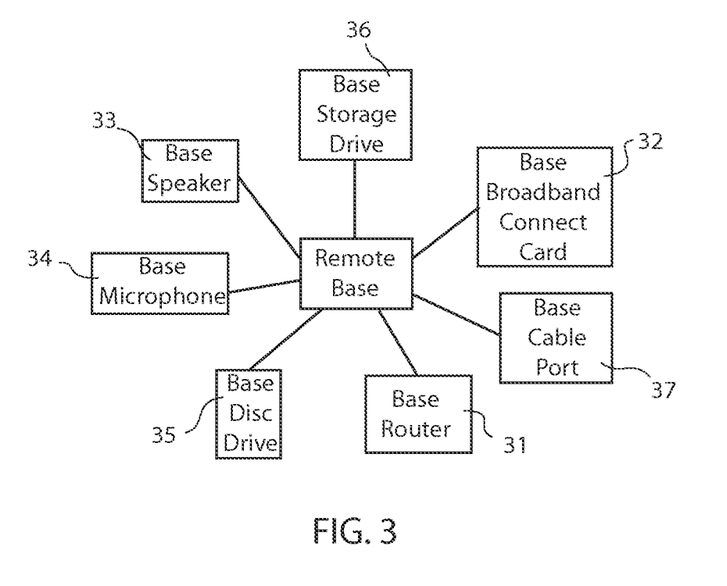
FIG. 3 is a system diagram of the remote base.

In reference to FIG. 3, the remote base 3 is one of the master devices of the present invention. The universal media remote 2 is to be used in conjunction with either the entertainment main console 4 or the remote base 3 as a main DVR unit. The remote base 3 similar to the entertainment main console 4, but does not possess the gaming abilities. The remote base 3 also includes a base router 31, a base broadband connect card 32, a base speaker 33, a base microphone 34, a base disc drive 35, a base cable port 37, and a base storage drive 36 for additional functionalities. The remote base 3 is able to provide the entertainment devices connected to the system of the present invention cable television by connection of the cable feed to the base cable port 37. The remote base 3 is connected to a user's existing DVR device for DVR capabilities. Similar to the entertainment main console 4, the remote base 3 provides a wireless network 99 with the base router 31. The user is able to activate and interact with the remote base 3 by means of the base speaker 33, the base microphone 34, or the universal media remote 2. The remote base 3 can act as a relay point or source for accessing and streaming media data by means of the base router 31 and base broadband connect card 32. With the base storage drive 36, the remote base 3 is also able to record and store media data in addition to the connected existing DVR device. Additional, any media data still stored on discs such as CDs, DVDs, and Blu-rays can be read and stored onto the base storage drive 36. This allows users to centralize all of their media onto a single source without the need for discs that can accumulate and clutter.

Figure 5:
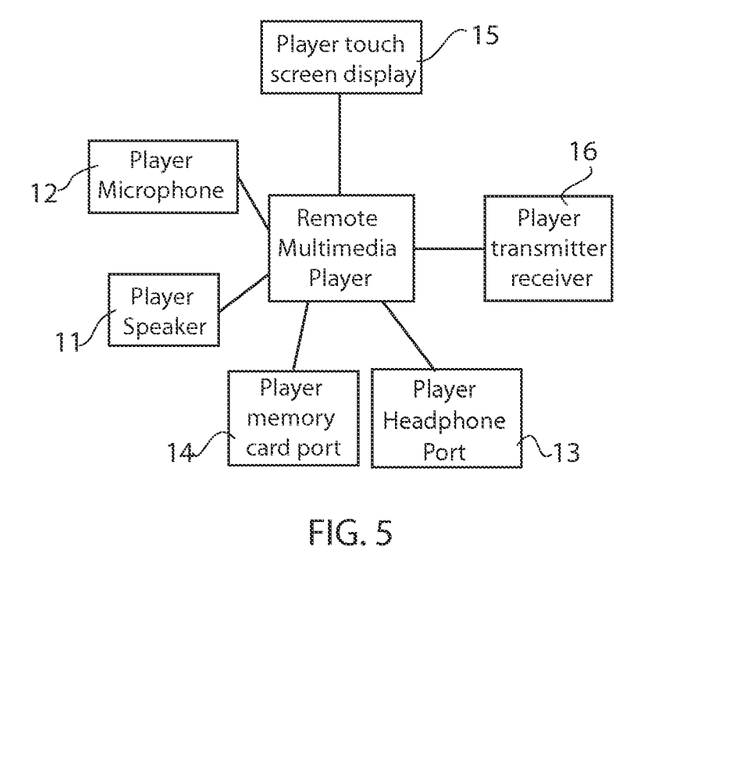
FIG. 5 is a system diagram of the remote multimedia player.

In reference to FIG. 5, the remote multimedia player 1 provides the user of the present invention mobility with media data and entertainment. The remote multimedia player 1 can synchronize with media data stored in any of the plurality of devices of the present invention. To synchronize, the remote multimedia player 1 makes use of a player transmitter receiver 16. The remote transmitter receiver 21 allows the remote multimedia player 1 to access and receive media data stored in the plurality of devices. The synchronization of the media data allows the remote multimedia player 1 to download through the wireless network 99 media data for storage into a player memory card positioned in a player memory card port 14. The remote multimedia player 1 is fully portable and can play media visually through a player touch screen display 15 and a player speaker 11. For privacy, the user can connect a pair of headphones or earphones into a player headphone port 13. The player headphone port 13 will reroute the playing of the media to the headphone port to be played on the headphones. The user is able to manage the media data by interacting with the remote multimedia player 1 by the player touch screen display 15. An additional method for interaction with the remote multimedia player 1 is by the player speaker 11 and the player microphone 12 with voice interaction. When the remote multimedia player 1 is outside of the range of the wireless network 99, the player transmitter receiver 16 is able to access a mobile internet network provided by wireless companies. The user will need to subscribe for data plans with the wireless cellular companies for this function. The remote multimedia player 1 is able to transmit music wirelessly to the streaming dock 6 by means of the player transmitter receiver 16 through FM radio signals.

In reference to FIG. 1, FIG. 6, FIG. 7, FIG. 8, and FIG. 9, the streaming dock 6 is a satellite device of the present invention that can be connected to entertainment devices by a dock connection port 64. The dock connection port 64 includes different types of ports including USB ports, audio output ports, or any other suitable means of transferring media data to the entertainment devices. These entertainment devices can include household devices such as home televisions, radios, and speaker systems or vehicle devices such as onboard vehicle televisions and vehicle audio systems. The streaming dock 6 can be connected to a television within the house for receiving media data. The streaming dock 6 utilizes a dock wireless receiver 61 to access the wireless network 99 and the other plurality of devices for software usage and streaming of media data to be played on the connected entertainment device. The streaming dock 6 can be connected directly to the back of a television using HDMI cables or any other suitable audio/video cables. The streaming dock 6 connected to the household entertainment devices are power by connection to a standard wall outlet. However, for vehicles, the streaming dock 6 can be connected to the vehicles entertainment system and 12V outlet. When a vehicle is outside of the range of the wireless network 99, the user can use the remote multimedia player 1 to transmit media to the streaming dock 6. The streaming dock 6 for vehicles utilizes voice activation and blue tooth technology for user interaction. The remote multimedia player 1 is able to transmit media data directly to the streaming dock 6 by means of the direct connection to the streaming dock 6. The user is able to activate and interact with the streaming dock 6 by voice commands through a dock speaker 62 and dock microphone 63.

In reference to FIG. 1, FIG. 7, FIG. 8, and FIG. 9, the wireless network 99 cast by the entertainment main console 4 or the remote base 3 also provides the plurality of devices internet access by means of a console broadband connect card 42 or a base broadband connect card 32, respectively. The remote multimedia player 1 having the player transmitter receiver 16 will be able to access the internet and thousands of different applications when it is within the wireless network 99. In some embodiments, the wireless network 99 is a telecommunications network. In other embodiments, the wireless network 99 is a cellular telecommunications network. The remote multimedia player 1 is able to stream media data from the base through the wireless network 99 or stream television shows or other media data from the internet network. The universal media remote 2 having the remote transmitter receiver 21 will be able to access the internet and android features for thousands of different applications as well. Each main entertainment console is also equipped with the android features and internet access. The streaming dock 6 having the dock wireless receiver 61 will also be able to access the internet to stream media. The entertainment main console 4 or the remote base 3 providing internet access for all of the devices in the present invention, also allows access to internet applications such as Youtube, Facebook, Netflix, the apple store, internet search engines, and thousands of other internet applications. Through the internet connection, the user can create an online account with a main entertainment page 98 can be used to purchase movies, television shows, games, music, or any other forms of entertainment. Any media data that the user already possesses and that is already stored into the plurality of devices can be synchronized onto the main entertainment page 98 online to centralize all the media data. This allows any of the plurality of devices with internet access to be able to stream media directly from the main entertainment page 98 if not streamed directly from device to device. The entertainment main console 4 and the remote base 3 are cable card devices. Cable card devices and decoders replace digital cable boxes and allow compatible devices such as game consoles to receive digital cable channels without a cable box. With all the plurality of devices being connected wirelessly through the wireless network 99, the present invention provides for each of the plurality of devices a subpage. The subpage for each of the plurality of devices can be customized by the user to represent the device and the location of the device. The user can customize the subpage to provide easy access to favorite television channels, shows, games, or any other media provided by the present invention. The subpage is the interface that is displayed on the plurality of devices that allows the user to access the wireless network 99. The subpages are compatible to access software such as Linux, or Windows. The user is also able to set up a media account to access the internet for the purchasing and downloading of new media through the entertainment main console 4. The entertainment main console 4 doubling as a game console is able to download and play video games without the need for users to buy a game on disc. With all of the functions available, the entertainment main console 4 is essentially a combination multiplex Blu-ray HD DVR and game console DVR which additionally allows children to access entertainment through childproof personalized nickname/voice activation accounts on all master devices. The console storage drive 54 is a partitioned hard drive to provide DVR features and individual data to different streaming docks 6 and televisions with shared hard drives. The displays on the plurality of devices are customizable with interchangeable frames for playlists of all media including the existing and additional devices. They will have the ability to connect to the main entertainment console 4.

The player touch screen display 15, the remote touch screen display 23, and the console touch screen display 45 are all 3 sided touch screen displays that can simulate entertainment titles in a miniature version. Additionally, for all of the touch screen displays for the remote multimedia player 1, the universal media remote 2, and the entertainment main console 4 all comprises of a magnifying and zooming feature for ease of viewing.

When the user turns on any of the plurality of devices to access the wireless network 99, they will be brought to the introduction subpage. The user can customize the introduction subpage with an intro song to play at the time of loading. The subpages will have scroll bars for navigation purposes. The subpage will have sets of icons representing the different types of entertainment. The icon sets allow users to access the different functions of the system including viewing of personal photos, set screen savers, view sports highlights, music playlists, DVR functions, internet applications, online purchasing stores and other forms of entertainment. The media accessed through the subpage can all be streamed directly from the main entertainment page 98 by internet connection.

Figure 6:
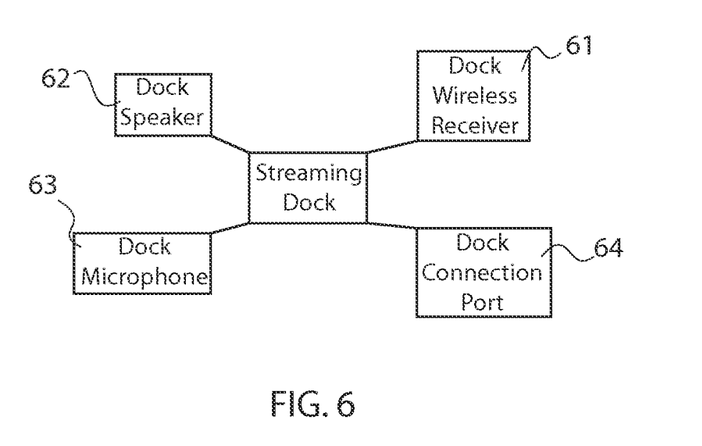
FIG. 6 is a system diagram of the streaming dock.
Figure 7:
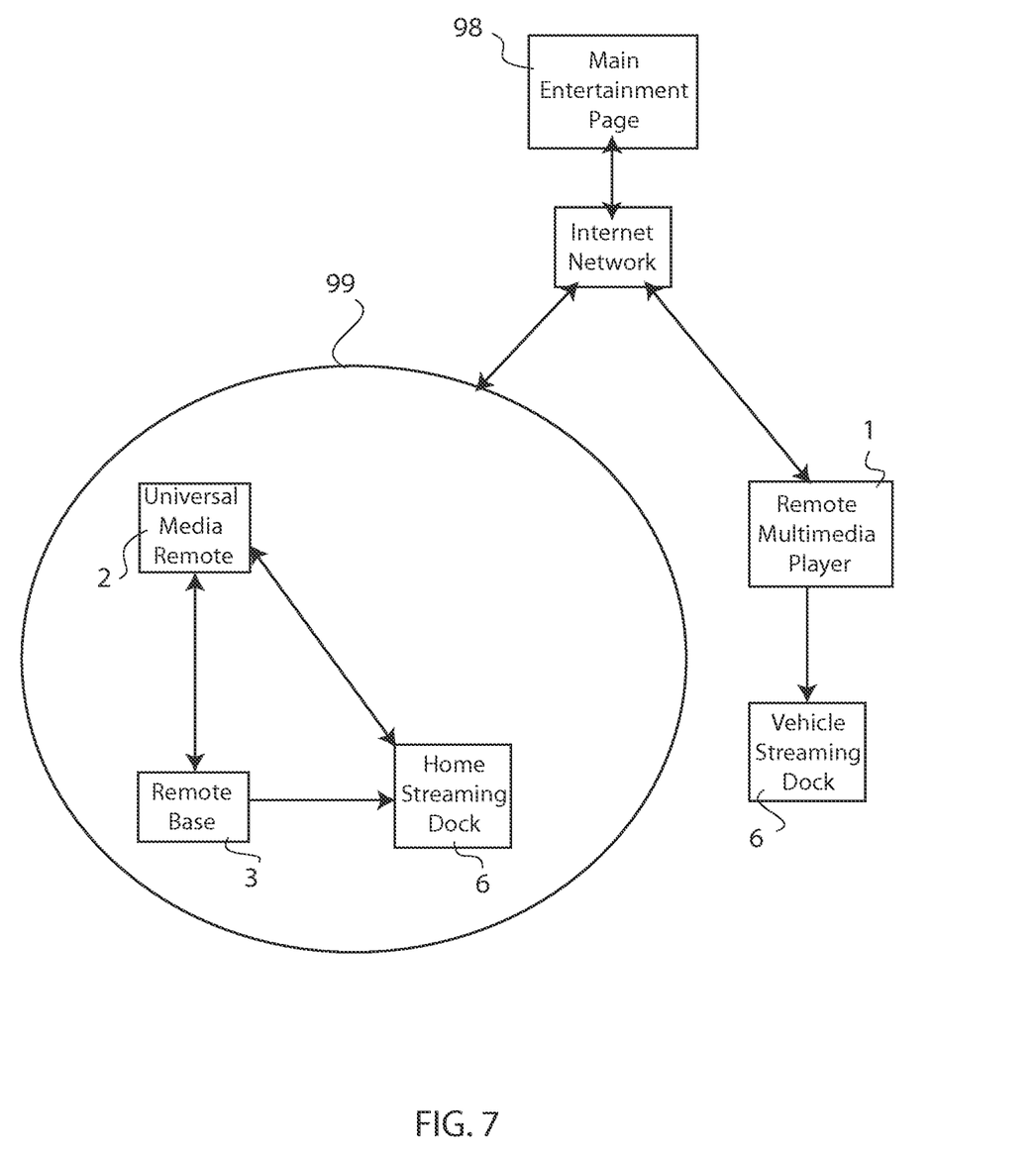
FIG. 7 is a wireless connection diagram of the present invention showing all of the plurality of devices within the range of the wireless network of the remote base except for a vehicle streaming dock and the remote media player. The arrows represent the transmission and receiving of media data. The remote multimedia player being outside of the wireless network range is still able to access the internet network and main entertainment with service for a wireless data plan.
Figure 8:
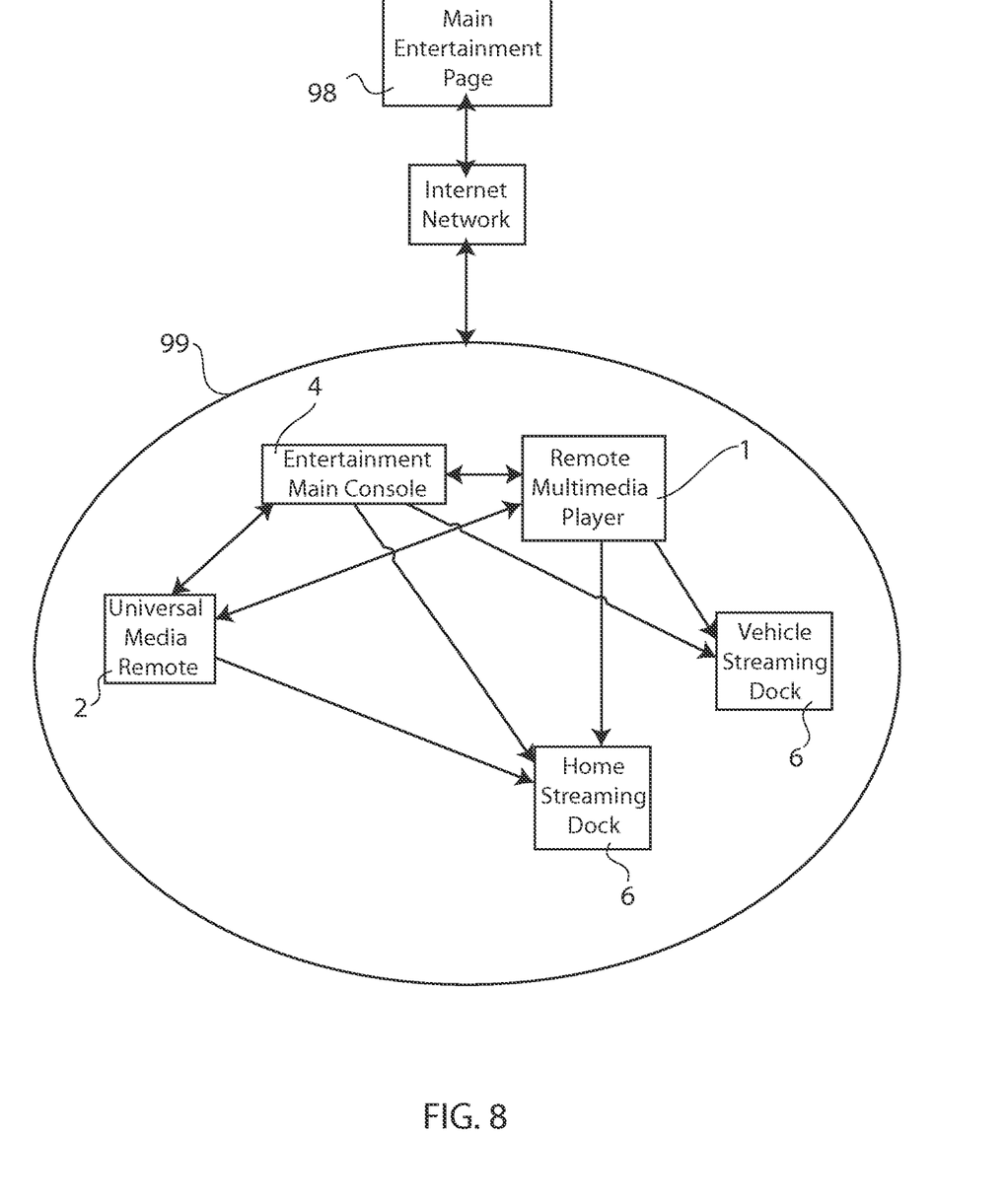
FIG. 8 is a wireless connection diagram of the present invention with all of the plurality of devices within the range of the wireless network of the entertainment main console. The arrows represent the transmission and receiving of media data. The wireless network allows the devices to access the internet network and the main entertainment page to stream media.
Figure 9:
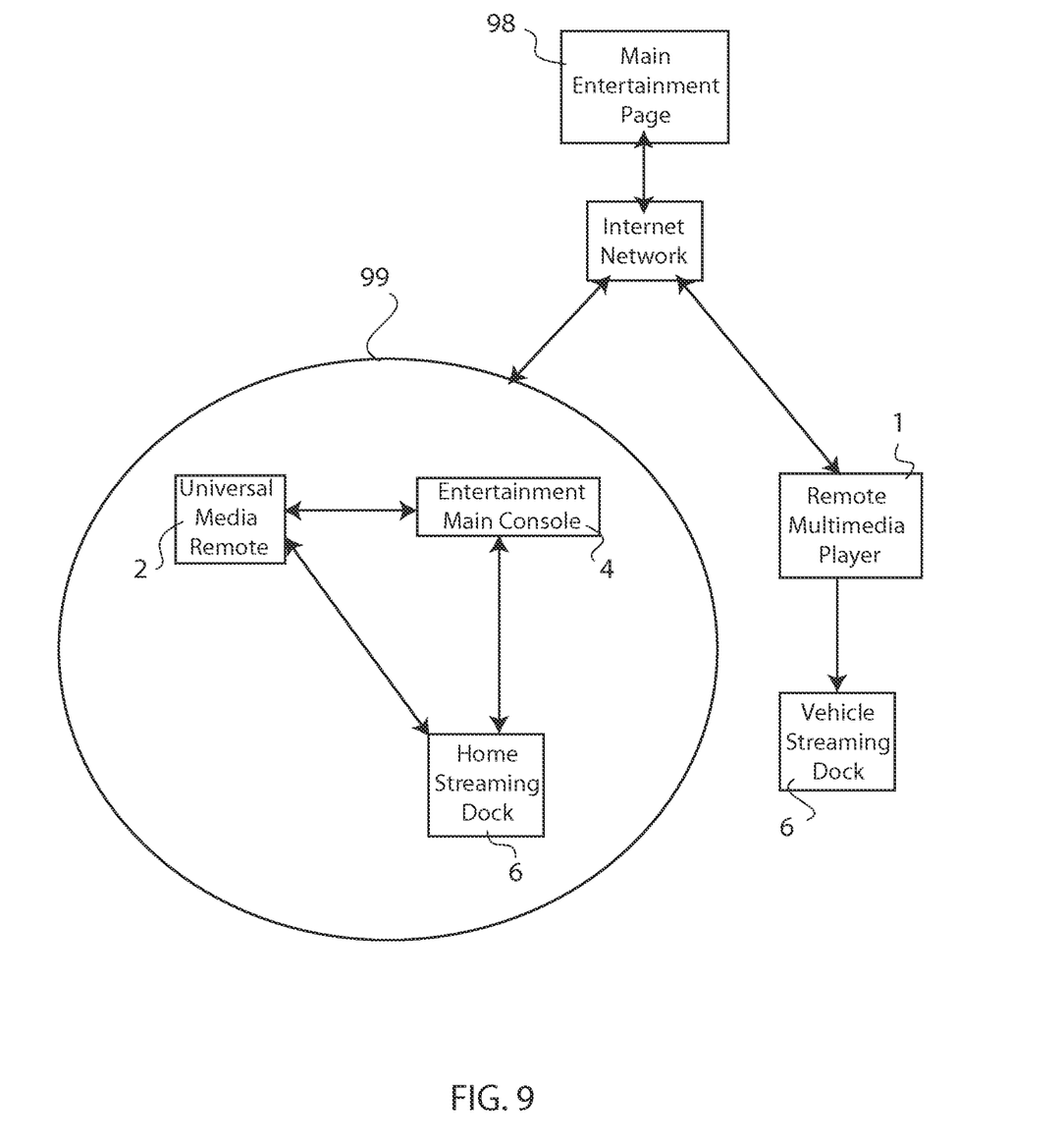
FIG. 9 is a wireless connection diagram of the present invention showing all of the plurality of devices within the range of the wireless network of entertainment main console except for a vehicle streaming dock and the remote media player. The arrows represent the transmission and receiving of media data. The remote multimedia player being outside of the wireless network range is still able to access the internet network and main entertainment with service for a wireless data plan.

Though not mandatory, all streaming dock 6 can be personalized with individual channels, shows, and commercials. If chosen, open cable allows users to enjoy all the cable entertainment in which the user has compiled, programmed, and rated appropriate for the entire home and vehicles. Without signing on to any specified page any additional entertainment such as movies, music, applications, stores, and games are available through the entertainment playlist by accessing the icon located on the lower right hand corner of the subpage.

The sign-on page allows the user to sign on to any entertainment playlist personalized to each person of the user's family, depending on room/vehicle. After signing on, the sub page will allow the user to enjoy open cable entertainment, browse personal pictures, games, and preview commercials from participating partner companies such as Sony, Microsoft, Apple, and Panasonic through a condensed version.

Each individual of the user's family can create a personalized entertainment page to store all of their personalized music, movies, cable entertainment, games, and playlists according to specified adaptor ratings. The personalized entertainment page provides users with DVR functions and allows users to create personalized playlists for all chosen forms of entertainment. During this, the master devices such as the streaming dock 6 or the entertainment main console 4 are able to highlight or identify parts of songs, movies, or games to see if there are any additional similar entertainments that the user may be interested in. This feature is also able to give the user feedback on sequels to certain movies, related soundtracks, and purchasing options for the recommended media. The entertainment main console 4 is able to monitor and keep track of all media purchased, viewed, and stored throughout the entire family.

The present invention can be bought by users in different types of packages for different purposes. A multiplex DVR game console package will come with an entertainment main console 4 with full DVR and game console capabilities. The package will also come with a remote multimedia player 1 with an Audio video receiver, a universal media remote 2, two in-home streaming docks 6 and optional remotes for access to entertainment pages. The two in-home streaming docks 6 allow users to access different channels on different televisions. In this package, the universal media remote 2 is charged by connection to the entertainment main console 4. The console for this package is made to look like and oversized remote multimedia player 1 with a large LCD touch screen. Additional streaming docks 6 are sold separately.

Another combination package available for a user is a multiplex Blue Ray DVR/HD DVR package. This package comes equipped with a universal media remote 2 without a remote base 3 as an entertainment main console 4 will serve as a base for charging. Additionally, the package will include two streaming docks 6 with access to entertainment pages.

Another combination package available for a user is a universal media remote 2 package with a universal media remote 2, a remote base 3, and two streaming docks 6 with options to access entertainment pages on two individual televisions throughout a user's home. The remote base 3 is directly attached to an existing DVR unit and will act as the main console of the system package. The streaming docks 6 are also used to access other media held in master devices such as the remote base 3. However, the streaming dock 6 is only able to access media in master devices if the universal media remote 2 is present.

Another combination package available for a user is the remote multimedia player 1 package with an audio/video receiver. The remote multimedia player 1 acts as an external DVD/DVR media hard drive for a vehicle's existing on-board television, CD/DVD player. The package comes with one streaming dock 6 to access not only the entertainment page, but also the media stored on the remote multimedia player 1 and the any master devices such as the entertainment main console 4. To stream the media to a vehicle's existing on-board entertainment devices, the streaming dock 6 is connected to the vehicle's 12V output to retain power and connected to the audio video system to play the media. The remote multimedia player 1 will be able to access television shows and other media through the internet from a wireless data plan from cell phone companies. The remote multimedia player 1 will be able to record the streamed media to allow users to rewind or fast forward.

Another combination package available for a user is the entertainment software/hardware package. This is an upgraded package which brings the present inventions' unique media format, hard drive, DVR capability, media playlists, internet access, thousands of applications and an all in one in home media network to televisions and associated electronics for in-home and vehicle usage. For example, if associated with Microsoft, the system's features, mainly allowing a user to rent, buy, or download and access media may be a standard option on all new Ford vehicles as an internal master devices with the addition of Microsoft synchronization.

Any of the plurality devices that are bought together in any combination from the packages will automatically be synchronized with the same unique coding. Devices that are bought separately will not be able to synchronize to the other devices unless the user contacts the provider to synchronize the device with the other devices. Though separate devices are bought separately, there is a limit to the number of devices synchronized together in a system. Additionally, only a single remote is permitted for one account. If the remote multimedia player 1 is bought separately, the user will not be able to synchronize the remote multimedia player 1 with the other devices. However, the remote multimedia player 1 will still be able to access media data by streaming through the internet access through wireless data plans with wireless cellular companies. The user will be able to log onto the main entertainment page 98 through the internet connection to access all of the centralized media data. If the user still desires to synchronize the remote multimedia player 1 with the plurality devices, the user will be required to contact the provider to synchronize the remote multimedia player 1 to have the same access codes.

With the ability to stream media directly from the main entertainment page 98 with internet access, the plurality of devices does not need to be bought together and can operate independently. Even though the entertainment main console 4 is the main box, the streaming dock 6 is able to stream directly from the remote transmitter receiver 21 of the universal media remote 2.

Although the invention has been explained in relation to its preferred embodiment, it is to be understood that many other possible modifications and variations can be made without departing from the spirit and scope of the invention as hereinafter claimed.

We claim:

1. A method of using a cellular telecommunication network to control a television, the method comprising:
    connecting the television to the cellular telecommunication network, wherein the television comprises an entertainment main console configured to display a plurality of a screens of a plurality of media devices on the television, the entertainment main console comprises cellular telecommunication hardware and software;
    accessing the cellular telecommunication network to control the television over the cellular telecommunication network;
    operating an interface over the cellular telecommunication network, the interface comprising one or more screens operable by cellular telecommunication software for a user to control the television over the cellular telecommunication network;
    receiving data over the cellular telecommunication network;
    accessing one or more applications over the cellular telecommunication network to allow the user to access media content of the plurality of media devices over the cellular telecommunication network through the television operating on the cellular telecommunication network;
    streaming the media content of the plurality of media devices over the cellular telecommunication network to the television, wherein said streamed media content being accessed over through the one or more applications; and
    synchronizing the streamed media content onto a main entertainment page accessible over the cellular telecommunication network, wherein the main entertainment page is configured to be personalized to the user;
    wherein accessing the cellular telecommunication network is performed using a universal media remote and the universal media remote comprises a storage device.

2. The method of claim 1, wherein the data is data streamed from the cellular telecommunication network.

3. The method of claim 1 further comprising storing the data received over the cellular telecommunication network on a computer-readable medium.

4. The method of claim 1, wherein the entertainment main console is the television.

5. The method of claim 4, wherein the entertainment main console transmits the streamed data to the television.

6. The method of claim 4, wherein the entertainment main console further comprises a DVR.

7. The method of claim 4, wherein the entertainment main console comprises a memory card port.

8. The method of claim 4, wherein the entertainment main console comprises a console storage drive for storing media content received over the internet through the cellular telecommunication network.

9. The method of claim 1 further comprising accessing an online account over the cellular telecommunication network.

10. The method of claim 1, wherein the interface comprises cellular telecommunication software allowing access to the main entertainment page.

11. The method of claim 1 further comprising uploading one or more games to the entertainment main console.

12. The method of claim 11, wherein the one or more games are stored in a console storage drive.

13. The method of claim 1, wherein the universal media remote comprises a scroll ball, mouse, and/or touchscreen.

14. The method of claim 1, wherein the television interfaces with a mobile cellular device over the cellular telecommunication network.

15. The method of claim 1, wherein the interface comprises applications accessible over the cellular telecommunications network.

16. The method of claim 1, wherein the television comprises cellular telecommunication hardware.

17. The method of claim 1, wherein the television comprises cellular telecommunication software.

* * * * *